US007013133B2

(12) United States Patent
Hayduk

(10) Patent No.: US 7,013,133 B2
(45) Date of Patent: Mar. 14, 2006

(54) PORTABLE COMMUNICATION DEVICE THAT MAY PERMIT ONE WIRELESS NETWORK TO COMMUNICATE WITH ANOTHER WIRELESS NETWORKS AND METHOD THEREFOR

(75) Inventor: Matthew A. Hayduk, Calgary (CA)

(73) Assignee: Intel Corporation, Santa Clara, CA (US)

( * ) Notice: Subject to any disclaimer, the term of this patent is extended or adjusted under 35 U.S.C. 154(b) by 539 days.

(21) Appl. No.: 10/026,010

(22) Filed: Dec. 21, 2001

(65) Prior Publication Data

US 2003/0119546 A1 Jun. 26, 2003

(51) Int. Cl.
*H04M 3/00* (2006.01)

(52) U.S. Cl. .................. 455/419; 455/552.1; 455/418; 455/558; 455/432.1; 455/436; 709/200; 709/201

(58) Field of Classification Search ............ 455/552.1, 455/436, 554.1, 522, 69, 432.1, 426.1, 435.1, 455/419–420

See application file for complete search history.

(56) References Cited

U.S. PATENT DOCUMENTS

| | | | | |
|---|---|---|---|---|
| 5,266,782 | A * | 11/1993 | Alanara et al. | 235/380 |
| 5,828,956 | A * | 10/1998 | Shirai | 455/411 |
| 5,878,344 | A * | 3/1999 | Zicker | 455/426.1 |
| 6,002,936 | A * | 12/1999 | Roel-Ng et al. | 455/456.4 |
| 6,141,547 | A * | 10/2000 | Rousseau et al. | 455/426.1 |
| 6,308,061 | B1 * | 10/2001 | Criss et al. | 455/418 |
| 6,366,955 | B1 * | 4/2002 | Haakana et al. | 709/221 |
| 6,397,065 | B1 * | 5/2002 | Huusko et al. | 455/435.2 |
| 6,516,197 | B1 * | 2/2003 | Havinis et al. | 455/456.1 |
| 6,546,246 | B1 * | 4/2003 | Bridges et al. | 455/432.1 |
| 6,584,314 | B1 * | 6/2003 | Haumont et al. | 455/435.1 |
| 6,591,116 | B1 * | 7/2003 | Laurila et al. | 455/558 |
| 6,594,488 | B1 * | 7/2003 | Chow et al. | 455/426.1 |
| 6,654,362 | B1 * | 11/2003 | Palamara | 370/332 |
| 6,735,434 | B1 * | 5/2004 | Criss et al. | 455/418 |
| 6,738,635 | B1 * | 5/2004 | Lewis et al. | 455/466 |
| 6,771,964 | B1 * | 8/2004 | Einola et al. | 455/437 |
| 6,810,245 | B1 * | 10/2004 | Hinds et al. | 455/418 |
| 2002/0061766 | A1 * | 5/2002 | Sato et al. | 455/552 |
| 2002/0119776 | A1 * | 8/2002 | Vestergaard et al. | 455/436 |
| 2002/0138545 | A1 * | 9/2002 | Andreakis et al. | 709/200 |
| 2003/0008644 | A1 * | 1/2003 | Akhterzzaman et al. | 455/418 |
| 2003/0013434 | A1 * | 1/2003 | Rosenberg et al. | 455/414 |
| 2004/0132486 | A1 * | 7/2004 | Halonen et al. | 455/552.1 |

FOREIGN PATENT DOCUMENTS

| | | |
|---|---|---|
| WO | WO 00/01094 | 1/2000 |
| WO | WO 01/11911 | 2/2001 |
| WO | WO 200111911 A1 * | 2/2001 |

OTHER PUBLICATIONS

Copy of PCT Search Report. Mar. 25, 2003.

* cited by examiner

*Primary Examiner*—William Trost
*Assistant Examiner*—Sharad Rampuria
(74) *Attorney, Agent, or Firm*—Lanny L. Parker

(57) ABSTRACT

Briefly, in accordance with one embodiment of the invention, a portable computing or communication device includes a classmark. A first network may poll the portable communication device and alter the classmark, and thus, alter how a second network interacts with the portable communication device.

28 Claims, 3 Drawing Sheets

100

PORTABLE COMMUNICATION DEVICE THAT MAY PERMIT ONE WIRELESS NETWORK TO COMMUNICATE WITH ANOTHER WIRELESS NETWORKS AND METHOD THEREFOR

BACKGROUND

Mobile computing devices such as, for example, portable personal digital assistants, cellular phones, etc. allow a user to perform computing and/or communication functions from many locations while the user is moving with the device. Given their mobile nature, security is often a significant issue to ensure that a user is authorized to interact or use the resources of a particular wireless network.

Typically, mobile communication devices are programmed with identification information that is used by the wireless network to determine if that particular device is permitted to interact with the network. Another security feature on many cellular communication devices is to define a classmark or profile that is stored within the cell phone. The classmark may define or limit how the cell phone may interact with particular wireless networks.

The use of such restrictive techniques makes it difficult, if not impossible, for a mobile communication device (e.g. a cell phone) to interact with or share information over multiple networks. Thus, there is a continuing need for better ways to allow communication devices to interact with multiple networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawing in which:

Figure 1:
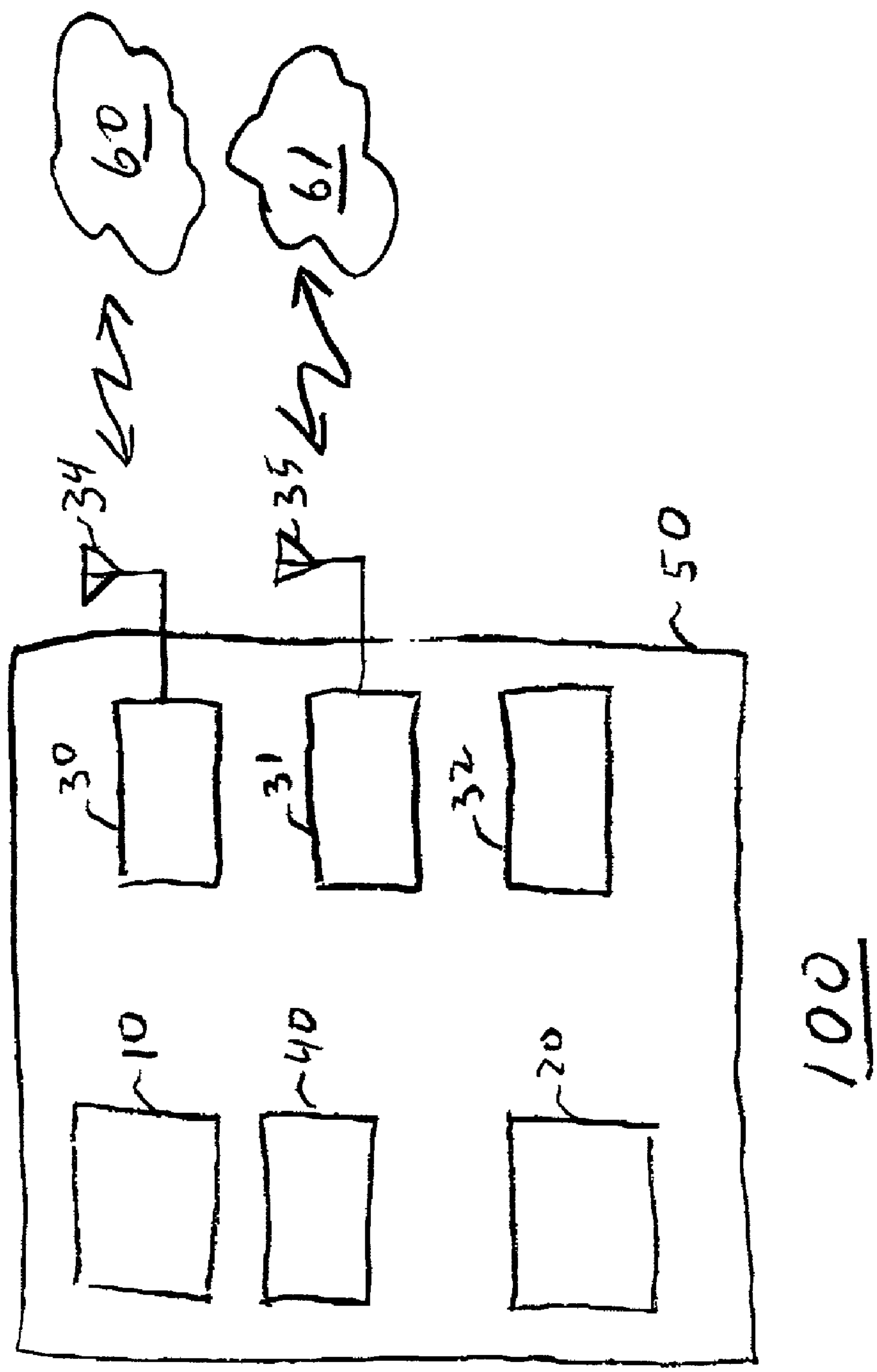
FIG. 1 is a block diagram representation of a mobile device in accordance with an embodiment of the present invention.

It will be appreciated that for simplicity and clarity of illustration, elements illustrated in the figure have not necessarily been drawn to scale. For example, the dimensions of some of the elements are exaggerated relative to other elements for clarity.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Turning to FIG. 1, an embodiment 100 in accordance with the present invention is described. Embodiment 100 may comprise a portable computing or communication device 50 such as a mobile communication device (e.g., cell phone), a two-way radio communication system, a one-way pager, a two-way pager, a personal communication system (PCS), a portable computer, or the like. Although it should be understood that the scope and application of the present invention is in no way limited to these examples. Other embodiments of the present invention may include other computing systems that may or may not be portable or even involve communication systems such as, for example, desktop or portable computers, servers, network switching equipment, etc.

In this particular embodiment portable communication device 50 may include a processor 10 that may execute instructions such as instructions stored in a memory 40. Processor 10 may be one of a variety of integrated circuits such as, for example, a microprocessor, a central processing unit (CPU), a digital signal processor, a microcontroller, a reduced instruction set computer (RISC), a complex instruction set computer (CISC), or the like, although the scope of the present invention is not limited by the particular design or functionality performed by processor 10. In addition, in some alternative embodiments, portable communication device 50 may comprise multiple processors that may be of the same or different type. For example, in another embodiment, portable communication device 50 may comprise a CISC processor to execute general user applications and a base band processor that may be used to initiate and receive wireless communications.

Portable communication device 50 may also comprise a display 20 to provide information to a user and communication modules 30–32 to provide access to other devices, service, networks, etc. For example communication modules 30–32 may be used to allow portable communication device 50 to communicate with other devices networks through either a wired or wireless link. As shown, communication modules may use antennae 34–35 to wirelessly communicate with networks 60–61.

Although the scope of the present invention is not limited in this respect, communication modules 30–31 may employ a variety of wireless communication protocols such as cellular (e.g. Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like).

In addition, communication modules may use other wireless local area network (WLAN), wide area network (WAN), or local area network (LAN) protocols such as the Industrial Electrical and Electronics Engineers (IEEE) 802.11 standard, Bluetooth™, infrared, etc. (Bluetooth is a registered trademark of the Bluetooth Special Interest Group).

It should be understood that the scope of the present invention is not limited by the types of, the number of, or the frequency of the of communication protocols that may be used by portable communication device 50. Furthermore, alternative embodiments may only have two communication modules (either wired or wireless) and communication modules need not have separate antennae, and some or all may share a common antennae.

In this particular embodiment, portable communication device 50 may communicate or interact with a LAN (e.g. network 60) and a cellular network (e.g. network 61. As will be explained below, by communicating with both networks 60–61, this may allow network 60 to share or exchange information with network 61 via portable communication device 50. Alternatively, this may allow network 60 to modify how portable communication device interacts with network 61. For example, in one embodiment, if network 60 is the LAN associated with a hospital, network 60 may alter the operational characteristics of portable communication device 50 so that the user is prevented from receiving calls from a cellular network (e.g. network 61) or the two networks may collaborate to alternatively route the incoming call to another negotiated medium.

Portable communication device 50 may also comprise memory 40 that may comprise any variety of volatile or non-volatile memory such as any of the types of storage media recited earlier, although this list is certainly not meant to be exhaustive and the scope of the present invention is not limited in this respect. Memory 40 may be used to store sets of instructions such as instructions associated with an application program, an operating system program, a communication protocol program, etc. For example, the instructions stored in memory 40 may be used to perform wireless communications, provide security functionality for portable communication device 50, user functionality such as calendaring, email, internet browsing, etc. Memory 40 may also be used to store or maintain a classmark that may be used to define the operational characteristics of portable communication device 50.

Figure 2:
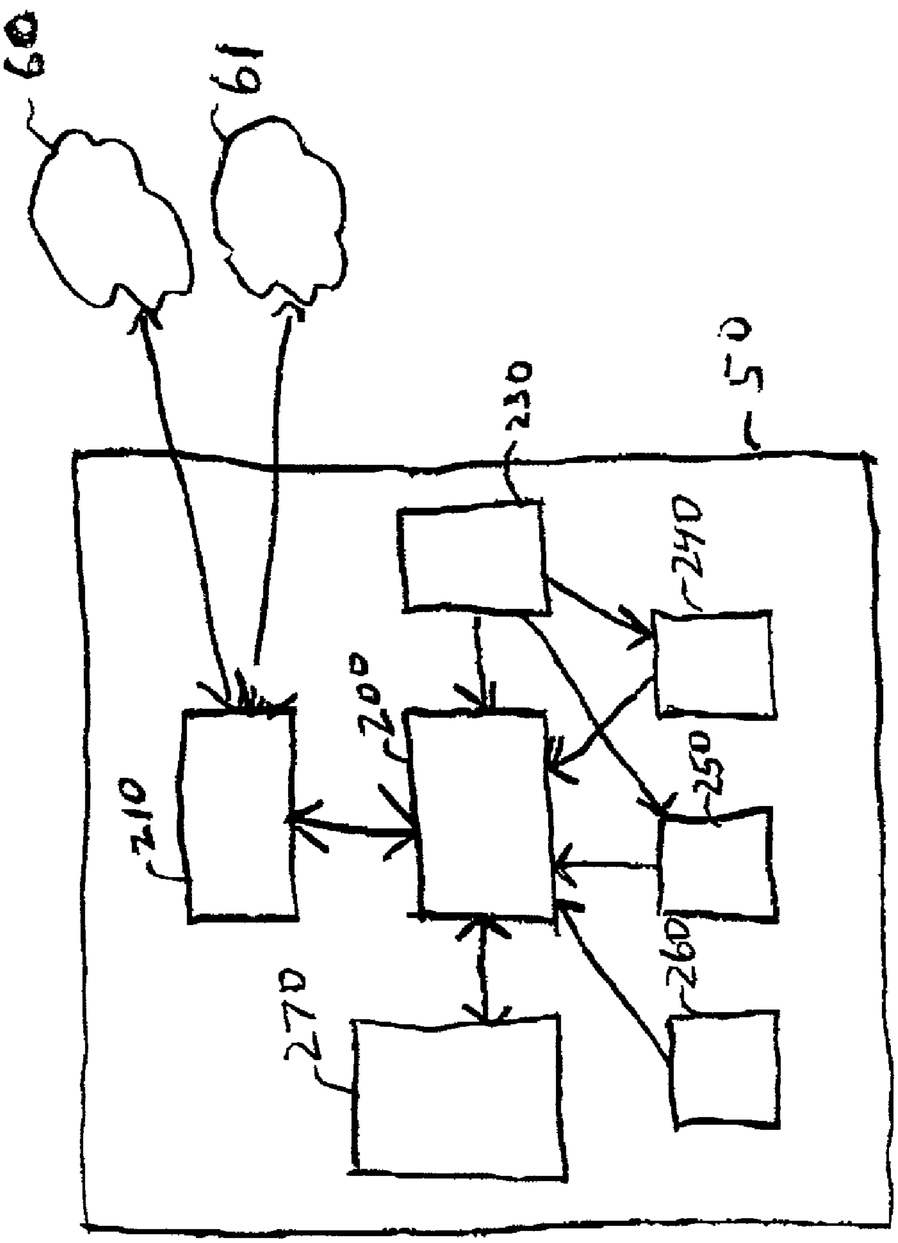
FIG. 2 is a logical model of a mobile device in accordance with an embodiment of the present invention.

Turning to FIG. 2, a particular embodiment of the present invention is provided. FIG. 2 is a logical model diagram representing the relationships and interactions between operations that may take place within portable communication device 50. It should be understood that the operations illustrated may be implemented with any combination of hardware and software. In other embodiments, operations shown in FIG. 2 and/or discussed below may be implemented entirely in hardware or entirely in software. Furthermore, the portions of the operations that are implemented, at least in part, with software may be implemented through an operating system, user applications, firmware, etc., although the scope of the present invention is not limited to just these examples.

While in operation, portable communication device 50 may dynamically generate and maintain a classmark 200. Classmark 200 may be a compilation of data that defines or indicates the current capabilities or attributes of portable communication device 50. Although the scope of the present invention is not limited in this respect, the capabilities or attributes may include the current physical capabilities, logical capabilities, the communication capabilities, processing capabilities, and/or user preferences for portable communication device 50.

Simply put, classmark 200 may be a list that provides information regarding various aspects of the operation of portable communication device 50 so that the execution of applications or functionality may be altered or scaled to balance various performance traits. For example, the information provided by classmark 200 may be used to alter how instructions (e.g. user applications) are executed to achieve a desired user defined performance level. The data may also be used to reduce the amount of power that may be consumed during the operation of portable communication device 50. Alternatively, classmark 200 may be used to select the method with which portable communication device 50 communicates to consider such factors as cost, reliability, security, bandwidth, power consumption, Quality of Service (QoS), interference, etc., although the scope of the present invention is not limited in this respect.

Although the scope of the present invention is not limited in this respect, classmark 200 may be stored or maintained in memory (volatile or non-volatile) within portable communication device 50. For example, the information that makes up classmark 200 may be stored as a table in memory 40 (see FIG. 1). Alternatively, classmark 200 may be stored or maintained in registers, cache(s), latches, or other circuitry.

In operation, portable communication device 50 may include a service discovery operation 210 that may be used to poll or query communication modules to determine what communication services are currently available. For example, service discovery operation 210 may poll communication modules 30–32 (see FIG. 1) to determine what communication techniques are currently available and the characteristics of those techniques (i.e. cost, reliability, bandwidth, etc.). For example, portable communication device 50 may be able to communicate with a cellular service network (61), a wireless LAN (e.g. network 60) or through a wired connection.

As a user moves, the communication services available to portable communication device 50 may change with time. In addition, the level, cost, or quality of the service may also change. For example, the user may move or roam such that its communicates with a cellular system that is not part of its normal or low cost service network. Accordingly, although the scope of the present invention is not limited in this respect, service discovery module 210 may periodically update classmark 200. Alternatively, service discovery module 210 may make the updates whenever there are changes in the communication services available (e.g. the user is no longer in range).

The information in classmark 200 may be used by applications executing in portable communication device 50 to select a communication techniques that may be the most cost effective, most secure, fastest, consume the least amount of power, etc., although the scope of the present invention is not limited in this respect. The applications may also be able to dynamically make changes as the user moves and the availability of particular communication methods changes. The applications may also use the information in classmark 200 to determine what services are provided to the user or how those services are provided.

Portable communication device 50 may also be adapted such that a user may be able to define some user preference. Such information may be tracked and provided by a user's preference module 230. Although the scope of the present invention is not limited to these examples, user preference module 230 may indicate particular performance levels desired by a user, indicate a desired Quality of Service (QoS) for operation, indicate a desired cost or security level for particular services or features, indicate a desired power consumption level, etc. This information may be used to indicate with classmark 200 to prioritize what hardware or software should be used by application executing on portable communication device 50. This information may also be used to select or prioritize the communication method to be used by portable communication device 50 in various situations.

Portable communication device 50 may also have a physical services module 240 that may update classmark 200 regarding the status or availability of particular hardware components (e.g. memory, cache, processing capabilities, input/output devices, etc.) within portable communication device 50. This information may provide the physical capabilities of portable communication device 50, which may be indicated through classmark 200. This information may be used by applications executing within portable communication device 50 to select what hardware or software should be used during the execution of those applications. For example, the applications may select the memory to be used for caching or select the I/O device to receive and provide information, although the scope of the present invention is not limited in this respect.

Portable communication device 50 may also have a logical services module 250 that may update classmark 200 regarding the status or availability of various logical services (e.g. Java scripts, translators, mail services, etc.) within portable communication device 50. This information may provide the logical capabilities of portable communication device 50, which may be indicated through classmark 200. This information may be used by applications executing within portable communication device 50 to select what logical services should be used during the execution of those applications.

Portable communication device 50 may also comprise a system load monitor 260 that may update classmark 200 regarding the current usage or load level of components within portable communication device 50. Although the scope of the present invention is not limited in this respect, system load monitor 260 may comprise any combination of hardware and/or software that may track the historical or current load of components within portable communication device 50. For example, system load monitor 260 may track the current bandwidth (i.e. available processing capability—typically measured in millions of instructions per second (MIPS)) of processor 10 (see FIG. 1). Alternatively, system load monitor 260 may also track the usage of memory components, caches, or I/O devices in portable communication device 50. This information may then be reflected in classmark 200. Since this information may be dynamically changing, system load monitor 260 may constantly or periodically update classmark 200, although the scope of the present invention is not limited in this respect.

This information may be used by applications executing on portable communication device 50 to scale themselves, or other applications, so that instructions may be executed or features may be provided to a user within the desired performance parameters. For example, this information may be used to lower the voltage potential or clock rate of processor 10, and thus the power consumption, of portable communication device 50 if there is sufficient bandwidth available to execute applications within the user's expectations.

Applications 270, such as user applications, operating system applications, or firmware, may use the information available with classmark 200 to adjust or scale their execution. For example, although the scope of the present invention is not limited in this respect, applications 270 may adjust their operation to enhance a user's experience. Alternatively, the execution of applications 270 may be altered to achieve a particular execution speed, power consumption, security level, etc. The information or list provided by classmark 200 may also be used by one application executing on portable computing device to scale the operation of another application that may be executing. This may be desirable to share resources or prioritize requests made by the user.

Furthermore, as a user moves and operates portable communication device 50, the capabilities available may change. Accordingly, classmark 200 may be dynamically generated, or alternatively, may be periodically updated, although the scope of the present invention is not limited in this respect. It should be understood that the scope of the present invention is not limited to any subset of modules shown in FIG. 2 that provide information used to set or define classmark 200.

In alternative embodiments, classmark 200 may be set or defined from sources other than those shown in FIG. 2. For example, in other embodiments, networks 60 and/or 61 may be able to modify or set classmark 200. This in turn, may then allow one of the networks that are communicating with portable communication device 50 to change or alter how another network communicates with portable communication device 50 as will be explained with reference to FIG. 3.

Figure 3:
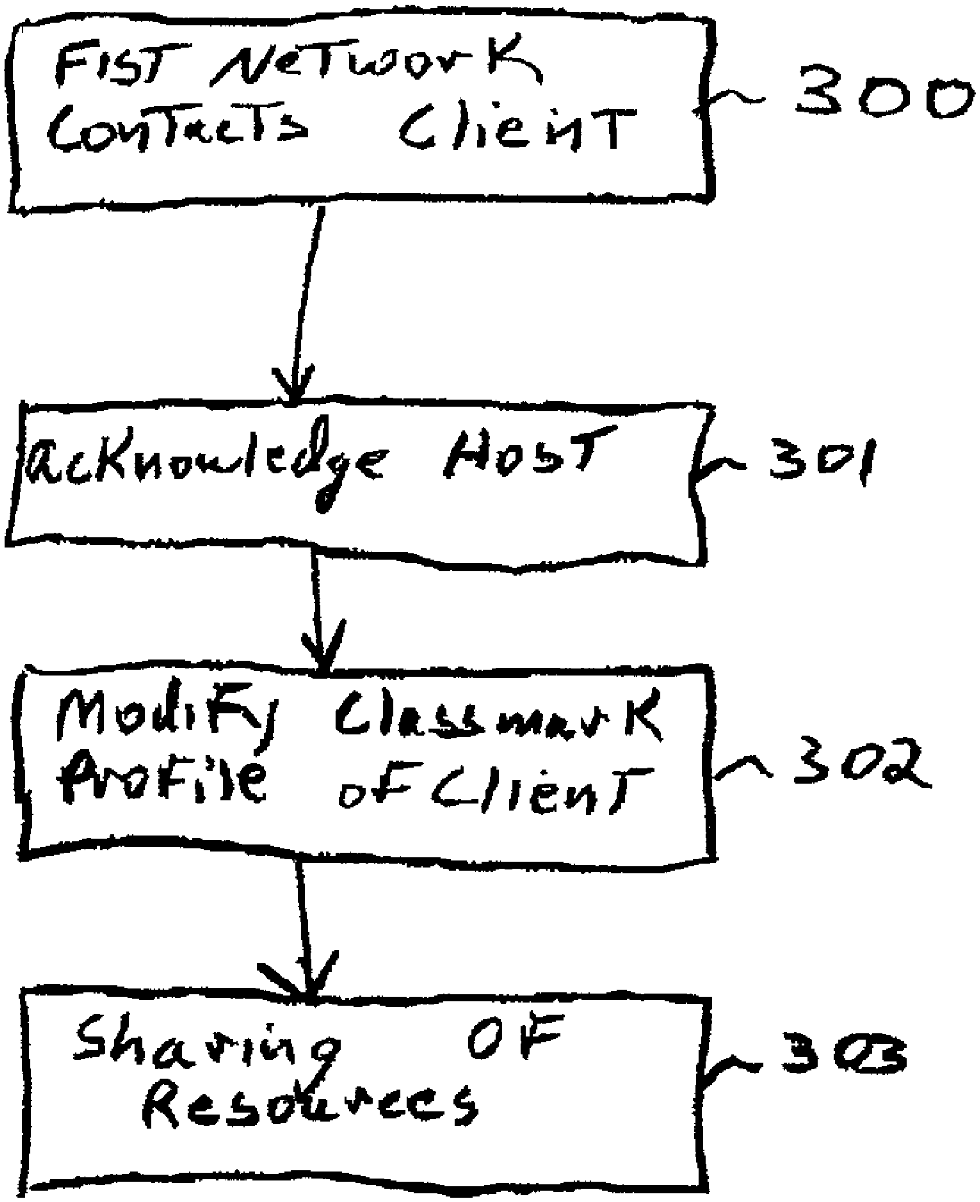
FIG. 3 is a flow chart of a method of operation in accordance with an embodiment of the present invention.

FIG. 3 illustrates a method in accordance with an embodiment of the present invention for how one network may modify the classmark of a portable communication device. The process may begin with a network (e.g. network 60 of FIG. 1) contacting a client device (e.g. portable communication device 50, block 300). Again network 60 may be any variety of wireless or wired network that may announce to portable communication device 60 information such as the types of services available with network 60, connection configurations or protocols for network 60, environment constraints, user interface specifications, etc., although the scope of the present invention is not limited in this respect.

Portable communication device 50 may then acknowledge network 60 and evaluate its hardware and/or software capabilities to determine what response, if any, should be sent to network 60, block 301. In addition, the client (e.g. portable communication device 50) may then inform network 60 of its operating characteristics. For example, portable communication device 50 may inform network 60 of the physical, logical, and/or functional capabilities of portable communication device 50. Although the scope of the present invention is not limited in this respect, this may be done by providing network 60 with all or part of the classmark 200 of portable communication device 50.

Thereafter, network 60 may then initiate a process to alter, modify, or update classmark 200 of portable communication device 50, block 302. This, in turn, may modify or alter how portable communication device 50 interacts or communicates with network 60 or other networks (e.g. network 61). Alternatively, this may also enable network 60 to be able to communicate with or share information with network 61.

Although the scope of the present invention is not limited in this respect, network 60 may initiate "provisioned" control over portable communication device 50. In other words, network 60 may share some of the hardware and/or software resources within portable communication device 50. Alternatively, portable communication device 50 may grant network 60 control of some of the internal resources of portable communication device 50. For example, network 60 may use the output resources (e.g. display, audio, etc.) to provide information or services to the user.

In another embodiment, network 60 may modify classmark 200 of portable communication device 50. This may alter or change how portable communication device 50 interacts with other networks. For example, network 60 may modify the classmark of portable communication device 50 to disable any communication with network 61, or alternatively, modify classmark 200 to disable any incoming or outgoing calls from network 61. This may be desirable, for example, to prevent a user from receiving or transmitting cellular communications while the user is in an environment where such communications are prohibited (e.g. a hospital, a theater, library, etc.).

In another embodiment, network 60 may use the provisioned control of portable communications device 50 to communicate or share information with other networks (e.g. network 60). For example, network 60 may communicate with network 61 using the resources of portable communication device 50. Thus, network 60 may be authorized and able to access information particular to portable communication device 50, or alternatively, personal information of the user. Although the scope of the present invention is not limited in this respect, network 60 may be able to retrieve information from network 61 such as the shopping preferences of the user, financial information of the user to facilitate purchases. Of course the use may control or limit what, if any, information is exchanged through the use of user preferences. Alternatively, a parent may control or define what information is exchanged or what services are made available to children who use portable communication device 50.

If network 60 is able to communicate and interact with network 61, then network 60 may be able to provide addition services to the user of portable communication device 50. For example, although the scope of the present invention is not limited in this respect, network 60 may be able to answer incoming calls from network 61 and provide voice messaging services if portable communication device 50 is not permitted to receive calls while in the environment. Thus, network 60 may be able to communicate with network 61 on behalf of the user. Alternatively, network 60 may be able to notify the user of portable communication device that he or she is not permitted to receive calls or that they have a message waiting for them. This type of interaction between the networks can be prearranged services that different local networks can activate and use if additional infrastructure requirements are met such as those perhaps for voice call routing.

In yet another embodiment of the present invention, network 60 may alter client classmark 200 so that network 61 is enabled to provide services to the user of portable communication device 50. In some situations, network 61 may not be able to provide portable communication device 50 with a particular service or services. This may be due to a variety of reasons, the environment surrounding the user, logical, physical, functional limitations of portable communication device 50, etc.

Thus, network 60 may share resources or enable other networks so that they may provide a service to portable communication device 50 that they would not otherwise be able to provide. For example, although the scope of the present invention is not limited in this respect, network 60 may provide information, such as movie show times, so that network 61 may then inform the user of portable communication device 50 when a favorite movie is available. Consequently, in this particular embodiment, network 60 may be able to change what services are available to a user from another network (e.g. network 61).

Returning to FIG. 3, in this particular example illustrated, network 60 and portable communication device 50 may be able to share resources to further enhance the experience provided to the user, block 303. Although the scope of the present invention is not limited in this respect, the combination of the information and resources available between network 60, network 61, and portable communication device 50, may enhance the features available to the user, or may even provide services that would not otherwise be available. For example, the combination may be able to provide information (e.g. messages, voicemail, etc.) to the user, or enable portable communication device 50 to serve as an access point to other wired or wireless devices. The combination can also allow new collaborative services to be built between the networks that will support the environment needs such as call routing from a cellular network over another infrastructure to a local network that then uses a non-cellular transport mechanism to communicate with the portable communication device 50.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A mobile communication device having characteristics defined with a classmark, comprising:

a service module to provide the classmark with a status or availability of an application scheduled to execute within the mobile communication device; and a communication module adapted to permit a first wireless network to update information to modify the classmark and alter how the mobile communication device interacts with a second wireless network to receive application updates.

2. The mobile communication device of claim 1, further comprising an alternate communication module, wherein the communication module is used to communicate with the first network and the alternate communication module is used to communicate with the second wireless network.

3. The mobile communication device of claim 2, wherein the communication module is adapted to communicate with a wireless local area network and the alternate communication module is adapted to communicate with a cellular network.

4. The mobile communication device of claim 1, wherein the mobile communication device is adapted to permit the first wireless network to communicate with the second communication network.

5. The mobile communication device of claim 1, wherein the mobile communication device is adapted to permit the first wireless network to access user information from the second wireless network.

6. The mobile communication device of claim 1, wherein the mobile communication device is adapted to permit the first wireless network to alter communication between the mobile communication device and the second wireless network.

7. The mobile communication device of claim 1, wherein the mobile communication device is adapted to permit the first wireless network to disable communication between the mobile communication device and the second wireless network.

8. The mobile communication device of claim 1, wherein the mobile communication device is adapted to permit the first wireless network to communicate with the second wireless network on behalf of a user.

9. The mobile communication device of claim 1, wherein the mobile communication device is adapted to permit the first wireless network to after the classmark so the second wireless network can provide a user with a service.

10. The mobile communication device of claim 9, wherein the mobile communication device is adapted to permit the first wireless network to alter the classmark so that the second wireless network can provide the user with the service only when the mobile communication device is not in communication with the first wireless network.

11. A method of interacting with a first network and a second network with a portable communication device, comprising:

updating a classmark with a status or availability of Java scripts that allow an application to execute within the portable communication device; and sending data from the first network to modify the classmark of the portable communication device.

12. The method of claim 11, wherein modifying the classmark alters how the second network interacts with the portable communication device.

13. The method of claim 12, wherein modifying the classmark disables communication between a user of the portable communication device and the second network.

14. The method of claim 11, wherein modifying the classmark disables the second network from interacting with the portable communication device.

15. The method of claim 11, further comprising:

exchanging information between the second network and the first network via the portable communication device.

16. The method of claim 11, further comprising:

polling the portable communication device with the first network to determine the classmark of the portable communication device.

17. The method of claim 11, further comprising:

requesting provisional control of the portable communication device with the first network.

18. The method of claim 17, further comprising:

transferring information from the second network to the first network via the portable communication device.

19. A method comprising:

polling a portable communication device from a first network to determine the classmark of the portable device;

checking the classmark for a status or availability of an application that executes within the portable communication device; and sending data from the first network to update and modify the classmark of the portable communication device.

20. The method of claim 19, wherein modifying the classmark includes altering how a second network interacts with the portable communication device.

21. The method of claim 19, wherein modifying the classmark includes changing what services are available to a user from a second network.

22. The method of claim 19, further comprising transferring information from a second network to the first network via the portable communication device.

23. The method of claim 19, further comprising disabling a service from a second network to a user of the portable communication device.

24. An article comprising a storage medium having stored thereon instructions, that, when executed by a computing platform, results in:

updating a classmark with a status of applications available to execute within a portable communication device;

polling the portable communication device from a first network to determine the classmark of the portable device; and initiating a process to update and modify the classmark of the portable communication device with a command from the first network.

25. The article of claim 24, wherein the instructions, when executed, further result in:

altering how a second network interacts with the portable communication device.

26. The article of claim 24, wherein modifying the classmark includes changing what services are available to a user from a second network.

27. The article of claim 24, wherein the instructions, when executed, further result in:

transferring information from a second network to the first network via the portable communication device.

28. The article of claim 24, wherein the instructions, when executed, further result in:

disabling a service from a second network to a user of the portable communication device.

* * * * *

UNITED STATES PATENT AND TRADEMARK OFFICE

CERTIFICATE OF CORRECTION

PATENT NO. : 7,013,133 B2
APPLICATION NO. : 10/026010
DATED : March 14, 2006
INVENTOR(S) : Hayduk It is certified that error appears in the above-identified patent and that said Letters Patent is hereby corrected as shown below:

In column 9, at line 49, delete "after" and insert --alter--.

Signed and Sealed this

Twenty-seventh Day of May, 2008

JON W. DUDAS
*Director of the United States Patent and Trademark Office*